United States Patent
Koch et al.

(10) Patent No.: US 9,597,942 B2
(45) Date of Patent: Mar. 21, 2017

(54) ROTATIONAL DAMPER FOR A MOTOR VEHICLE

(71) Applicant: AUDI AG, Ingolstadt (DE)

(72) Inventors: Tilo Koch, Ingolstadt (DE); Frank Gauterin, Leinsweiler (DE); Bastian Scheurich, Bad Wimpfen (DE)

(73) Assignees: AUDI AG, Ingolstadt (DE); KARLSRUHER INSTITUT FÜR TECHNOLOGIE, Karlsruhe (DE)

( * ) Notice: Subject to any disclaimer, the term of this patent is extended or adjusted under 35 U.S.C. 154(b) by 0 days.

(21) Appl. No.: 15/023,204

(22) PCT Filed: Jul. 19, 2014

(86) PCT No.: PCT/EP2014/001973
§ 371 (c)(1),
(2) Date: Mar. 18, 2016

(87) PCT Pub. No.: WO2015/039714
PCT Pub. Date: Mar. 26, 2015

(65) Prior Publication Data
US 2016/0229256 A1    Aug. 11, 2016

(30) Foreign Application Priority Data
Sep. 20, 2013    (DE) .......... 10 2013 015 702

(51) Int. Cl.
*B60G 21/08*    (2006.01)
*F16F 15/02*    (2006.01)

(52) U.S. Cl.
CPC .............. *B60G 21/08* (2013.01); *F16F 15/02* (2013.01); *B60G 2202/22* (2013.01); *B60G 2401/28* (2013.01)

(58) Field of Classification Search
CPC  B60G 21/08; B60G 2202/22; B60G 2401/28; B63B 39/04
(Continued)

(56) References Cited

U.S. PATENT DOCUMENTS

| 5,628,267 A | 5/1997 | Hoshio et al. |
| 2003/0029367 A1 | 2/2003 | Umemura et al. |

(Continued)

FOREIGN PATENT DOCUMENTS

| CN | 101132936 A | 2/2008 |
| CN | 102906460 A | 1/2013 |

(Continued)

OTHER PUBLICATIONS

International Search Report issued by the European Patent Office in International Application PCT/EP2014/001973.
(Continued)

*Primary Examiner* — Keith Frisby
(74) *Attorney, Agent, or Firm* — Henry M. Feiereisen LLC.

(57) ABSTRACT

A rotational damper for a motor vehicle, includes a gyro element which includes a first shaft mounted such that it can be rotated with respect to a first component and is connected to a second component which performs a relative movement with respect to the first component, wherein the first shaft has a frame, in which a second shaft lies orthogonally and is mounted rotatably, wherein the second shaft has a frame, in which a third shaft is mounted orthogonally with respect to the second shaft and such that it can be rotated in the second frame, wherein the second shaft and the third shaft are each connected to a shaft drive, and the third shaft has an inertia weight, wherein a rotation of the second shaft by (Continued)

the second shaft drive brings about a change in the angular velocity or the moment of the first shaft which is connected to the second component.

9 Claims, 2 Drawing Sheets

(58) Field of Classification Search
USPC .............................................. 74/5 R; 244/165
See application file for complete search history.

(56) References Cited

U.S. PATENT DOCUMENTS

| 2003/0129893 | A1* | 7/2003 | Gorshkov .............. B63H 19/02 |
| | | | 440/99 |
| 2004/0244513 | A1 | 12/2004 | Adams et al. |
| 2011/0185840 | A1* | 8/2011 | Firmage .................... F03G 3/08 |
| | | | 74/5 R |
| 2011/0231041 | A1 | 9/2011 | Kim et al. |
| 2013/0131920 | A1 | 5/2013 | Meitinger et al. |
| 2014/0195115 | A1 | 7/2014 | Müller et al. |
| 2014/0217663 | A1 | 8/2014 | Willems |
| 2014/0360825 | A1 | 12/2014 | Willems |

FOREIGN PATENT DOCUMENTS

| DE | 602 00 864 T2 | 8/2004 |
| DE | 10 2011 101 350 A1 | 11/2012 |
| DE | 10 2011 101 701 A1 | 11/2012 |
| EP | 0 650 890 B1 | 5/1995 |
| EP | 1 935 679 A1 | 6/2008 |
| EP | 2 103 471 A1 | 9/2009 |
| WO | WO 2011/100796 A1 | 8/2011 |

OTHER PUBLICATIONS

Chinese Search Report issued on Dec. 2, 2016 by the Chinese Patent Office in counterpart Chinese Patent Application No. 201480051548.7.

English translation of Chinese Search Report issued on Dec. 2, 2016 by the Chinese Patent Office in counterpart Chinese Patent Application No. 201480051548.7.

* cited by examiner

ROTATIONAL DAMPER FOR A MOTOR VEHICLE

CROSS-REFERENCES TO RELATED APPLICATIONS

This application is the U.S. National Stage of International Application No. PCT/EP2014/001973, filed Jul. 19, 2014, which designated the United States and has been published as International Publication No. WO 2015/039714 and which claims the priority of German Patent Application, Serial No. 10 2013 015 702.1, filed Sep. 20, 2013, pursuant to 35 U.S.C. 119(a)-(d).

BACKGROUND OF THE INVENTION

The invention relates to a rotational damper of a motor vehicle, in particular for dampening a movement of an unsprung mass relative to a sprung mass.

The chassis serves for coupling the vehicle superstructure with the street. Beside transmitting the forces relevant for driving, a vertical degree of freedom enables adjustment of the comfort behavior and the driving safety. The vibration behavior between the vehicle superstructure and the wheel, with its wheel guiding elements, is determined by a spring element and a damper element. The spring element serves for statically holding the superstructure. Changes in lift of the spring are stored as spring energy. The damper element serves for absorbing vibration energy of the superstructure, the sprung mass and also of the wheel with wheel carrier, the unsprung mass. Hereby the vibration damper directly connects the sprung mass and the unsprung mass. In the state of the art the throttle effect of the hydraulic fluid generally acts as a force against the relative velocity between the sprung and unsprung mass.

In addition the state of the art includes DE 10 2011 101 350 A1 or DE 10 2011 101 701 DE, which disclose using electric or electromagnetic forces for generating the force. Common to both is the fact that sprung and unsprung masses are connected via the damper element and a mutual support between both is present. Beside the fact that the gyroscopic effect in the region of the chassis is to be used in an automobile, an innovation relative to the state of the art is the targeted adjustment and the exertion of moments in all directions at any desired point in time, of the axis of the precision moment.

From the state of the art, DE 60 2008 64T2, US 20040244513A1 and WO2011/100796A1, gyrostabilizers are known for stabilizing a ship, whose movement is caused by waves. These gyrostabilizers for example contain a first sensor system, which measures the precession of a flywheel, a control system which generates a control signal, and an actuator, which provides the flywheel with a precession moment. The exerted precession moment hereby acts as regulated counter moment so that no driving energy is acting on the flywheel. In addition in the case of a ship only a rolling movement is generated, which is to be stabilized by the device.

In this context the patent document EP 0650890B1 discloses a device for suppressing the vibration of an object. For this a control moment gyro is provided which includes a flywheel, which is connected with a first shaft rotatably supported in a gimbal, wherein the gimbal includes a second shaft rotatably supported in an object whose vibration is to be controlled.

An angular sensor for measuring the rotation of the object to be controlled about an axis, which is normal to the plane defined by the first and second shaft.

For vibration damping, a generator is provided on the second axle which brakes in dependence on the measured angular velocity of the third axle, wherein the flywheel is kept in rotation via a motor.

In gyros the effect of precession is known. When the rotation axis of a rotating body is changed, a force is generated which is perpendicular to the rotation axis and the deflection axis. This force is referred to as precession. In a cardanic suspension the interaction between the individual rotational speeds and moments is described by the dynamic Euler equations $$M_a = J_a \dot{\omega}_a - (J_b - J_c)\omega_c\omega_b \tag{1}$$

$$M_b = J_b \dot{\omega}_b - (J_c - J_a)\omega_a\omega_c \tag{2}$$

$$M_c = J_c \dot{\omega}_c - (J_a - J_b)\omega_b\omega_a \tag{3}$$

in the body fixed coordinate system. Hereby the relationship $d\phi_i/dt = \omega_i$ and $d\omega_i/dt = \dot{\omega}_i$ applies, wherein $\phi_i$ is the actual angular position of the respective shaft.

SUMMARY OF THE INVENTION

It is an object of the invention to set forth an improved damper for a motor vehicle.

The object is solved by the independent apparatus claim.

The dependent claims represent an advantageous embodiment of the invention.

A rotational damper for a motor vehicle includes a first shaft, which is rotatably supported relative to a first component, and is connected with a second component which performs a rotary movement relative to the first component, wherein the first shaft has a frame in which a second shaft is orthogonally arranged and rotatably supported, wherein the second shaft has a frame in which a third shaft is arranged orthogonal to the second shaft and orthogonal to the third shaft and is rotatably supported in the second frame, wherein the second shaft and the third shaft are each connected with a shaft drive and the third shaft has an inertia weight, wherein a rotation of the second shaft by the second shaft drive causes a change of the angular velocity of the first shaft connected with the second component, wherein a first sensor is provided for determining the angular velocity of the first shaft, wherein a control unit for at least influencing the angular velocity of the second shaft is provided.

According to the invention a sensor different from the first sensor is connected with the control unit for determining changes in position of the vehicle. This allows influencing the second component via the second shaft which is connected with the unsprung mass, by taking the position of the vehicle into account. The invention utilizes the effect of the rotational inertia in order to introduce forces into the chassis at appropriate sites. These forces are to replace and further expand the function of a conventional damper element.

In an advantageous refinement the control unit can be connected with the second shaft motor so that the control unit increases the angular velocity and/or the torque of the second shaft. The active control of the second shaft motor allows actively adjusting the chassis by means of introducing energy.

By actively introducing energy, in particular four individual gyroscopic elements—cardanically supported gyro elements—can introduce impulses into the unsprung second component which is connected with the sprung masses, in particular the control arm, at the vehicle corners that directly exert forces or torques on the unsprung parts of the chassis via the second component, which beside allowing suppressing vibrations in the rolling movement also enables suppressing lifting and pitching movements. In addition a control of the vertical movement of each individual wheel is possible.

Regulating the torque on the second shaft or setting the angular velocity of the second shaft, results in a high torque $M_a$ on the outer shaft at a small torque $M_b$ when correspondingly selecting the moments of inertia.

This allows to operate the damper operate moment-free if needed, which has a positive effect in certain driving situations.

The greater the rotational speed can be set for the third shaft the smaller the mounting space can be selected that is occupied by a damper arrangement according to the invention. The entire energy inputted into the system by way of regulation or as a result of excitement via the road is converted by the device into rotational energy of the innermost shaft. By recuperation into electric energy this rotational energy can be provided outside the system. The kinetic energy resulting from stochastic road movements is hereby not purely converted into heat energy but is available for further use or storage. According to the invention the recuperation of dampening energy contributes significantly to the overall energy balance of the vehicle.

Preferably the frame, which connects the shaft ends, can be configured as a circular ring.

In particular detection devices are provided that detect the angular position of the first and second shaft as input values for the control unit. This enables avoiding an arrangement of the first and third shaft on top of each other and with this a singularity. In addition the angular velocity can be calculated from the angular positions. Also, a sensor for the direct detection can be provided for the detection of the angular velocity.

In a further advantageous embodiment the shaft motor, which drives the third shaft, may also be connected with the control unit. In this way the angular velocity of the third shaft can be determined via the motor for controlling the second shaft, or energy can be inputted into the shaft motor of the third shaft in order to accelerate the inertia weight.

In a further aspect the invention relates to a method for controlling a damper arrangement according to the invention. According to the method the torque of the first shaft and/or the angular velocity of the first shaft is controlled as a control variable. For this a manipulated variable is influenced at the second shaft so that the sign of the acceleration of the shaft corresponds to the sign of the angular velocity of the shaft.

In particular the manipulated variable of the torque can be determined based on a characteristic curve of the damper in which the torque of the first shaft is stored in dependence on the angular velocity. The manipulated variable for regulating the control variable is thus set independent of the measured angular velocity of the first shaft.

In a further aspect the invention relates to the use of a cardanically supported gyro element including a first shaft, which is supported for rotation relative to a first component and is connected with a second component, which performs a movement relative to the first component, wherein the first shaft has a frame in which a second shaft is orthogonally arranged and rotatably supported, wherein the second shaft has a frame in which a third shaft is arranged orthogonal to the second shaft and supported rotatable in the second frame, wherein the second shaft and the third shaft are each connected with a shaft drive and the third shaft has an inertia weight, wherein a rotation of the second shaft by the second shaft drive causes a change of the angular velocity or the moment of the first shaft connected with the second component, for dampening a movement of an unsprung mass of a motor vehicle relative to a sprung mass of the motor vehicle.

BRIEF DESCRIPTION OF THE DRAWING

Further advantages, features and applications of the present invention will become apparent from the following description in connection with the exemplary embodiments shown in the drawings.

In the description, the claims and the drawing the terms and associated reference signs listed in the list of reference signs are used. In the drawing it is shown in:

DETAILED DESCRIPTION OF PREFERRED EMBODIMENTS

Figure 1:
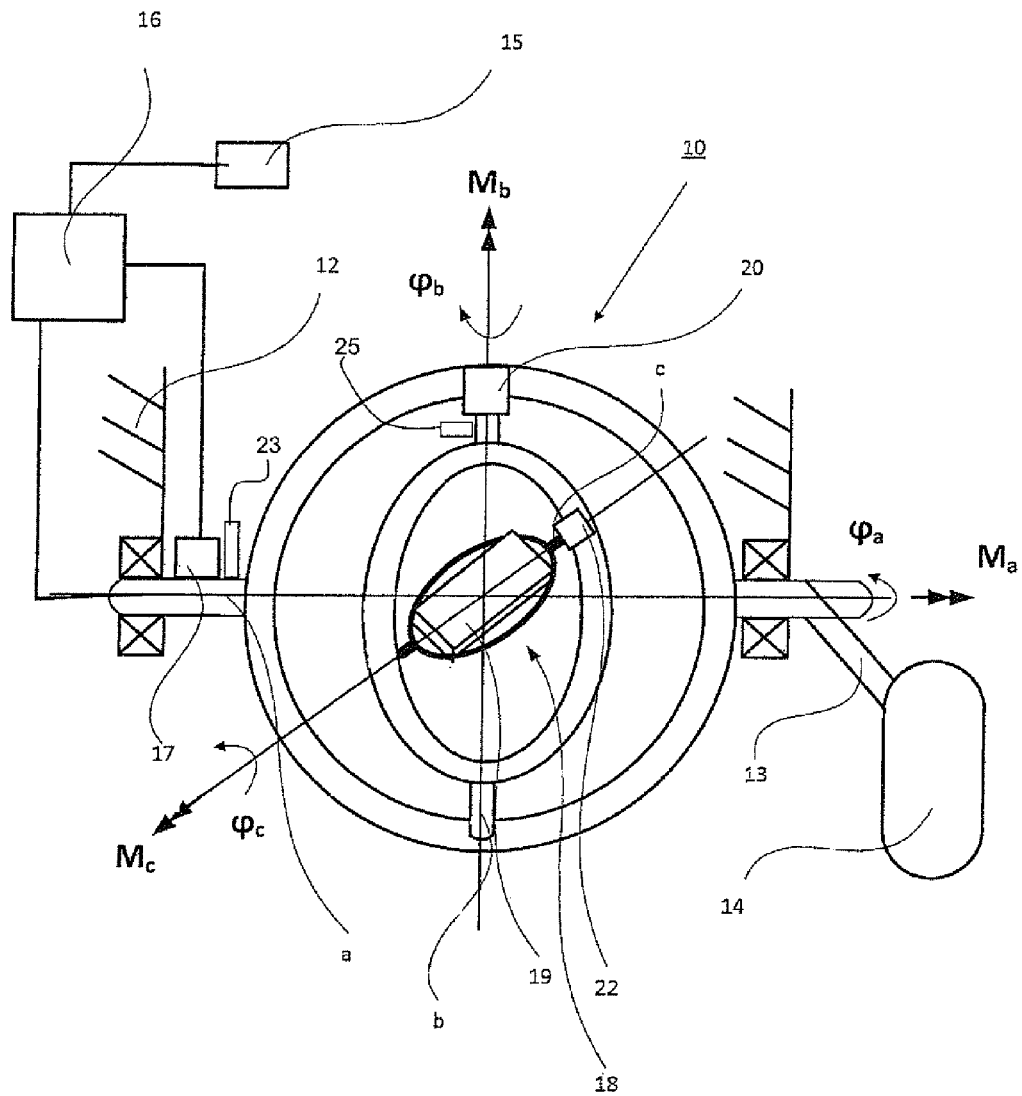
FIG. 1 a schematic representation of a damper arrangement according to the invention.

FIG. 1 shows a damper arrangement 10 according to the invention, including a cardanically supported gyro. The outermost shaft a enables a simple rotation $\phi_a$. This shaft a is connected with an unsprung mass, a wheel 14, via a transverse control arm 13, and is supported for rotation relative to the superstructure 12 of a vehicle.

In the shaft a a further shaft b is arranged rotated by 90°. This shaft rotates in the direction $\phi_b$. In the shaft b the shaft c is supported rotated by 90°. On the shaft c a gyro element 18 is arranged which rotates with shaft c in the direction $\phi_c$.

On the shaft c a rotation body 19 is located, which when rotating about its three spatial axes has the three rotational inertias of $J_a$, $J_b$ and $J_c$.

The inertia weight of the gyro element of shaft c is schematically shown as square-shaped rotation body 19 and exemplary illustrates the inertia sensor of the inertia weight with the inertias $J_a$, $J_b$ and $J_c$ assigned to the corresponding shafts. The transmission ratio of the individual torques is hereby determined by the rotational inertias $J_a$, $J_b$ and $J_c$ of the rotation body about its three spatial axes in the principal axes system. The strength of the moments depends on the angular velocity $\omega_c$.

In the starting state the rotation body rotates with a defined starting rotational speed $\omega_c$. In particular an angular velocity of the shaft c is $|\omega_c(0)| \gg 0$.

The angular position of the first shaft a is designated $\phi_a$ and the transmitted torque $M_a$. Corresponding considerations apply analogously to the second shaft b and the third shaft c.

The cardanic suspension of FIG. 1 is used for exerting a dampening force. Hereby the outermost shaft a is constructively connected to a chassis control arm for transmitting rotational speed and torque. The inwardly following second shaft b serves for controlling the rotational speed and the torque transmission.

When a moment $M_b$ occurs, a moment $M_a$ is generated due to precession. The moments lead to a rotation of the respective shaft with an associated rotational speed. A moment $M_b$ consequently leads to a rotational speed $\omega_b$ of shaft b. This rotation changes the direction of the angular velocity vector $\omega_c$ of the innermost gyro element. The gyro responds to such a disturbance with a precession $M_a$ in the direction $\phi_a$. However, because the angular velocity $\omega_c$ for constructive reasons also changes the angular velocity vector $\omega_c$ all three axes directly influence each other. The input of energy into one axle thus leads to a change of the energy of the two other axles. Excessive rotation energy is stored in the innermost third axle c.

Considering the shaft a as input, $M_a$ and $\omega_a$ have the same direction when energy is inputted into shaft a through excitation via the wheel 14. On shaft b this energy can then be retrieved again, wherein hereby $M_b$ and $\omega_b$ have opposite directions. The opposite case is also possible.

Values of $M_a$ and $\omega_b$ of the same direction lead to values $M_a$ and $\omega_a$ of different directions. When not retrieving the entire energy in shaft b, the rotational speed in shaft c increases due to the feedback effect. The excessive energy is stored in shaft c in the form of kinetic energy. Thus it is conceivable to use at least one shaft, maximally 2 shafts, as input or output for energy influences and to use the remaining shaft(s) as output or input.

The moment $M_a$ and angular velocity $\omega_a$ act from the wheel to the shaft a and set the system in motion. A relative movement on the shaft b results. When a counter moment $M_b$ is exerted to the angular velocity $\omega_b$, the relative moment on the shaft b is dampened. This in turn leads to dampening of the angular velocity $\omega_a$. Depending on how high the value $M_b$ is, the dampening is stronger or weaker.

According to the invention the moment $M_b$ is controlled so that $\omega_c$ and $\dot{\omega}_c$ always have the same sign. As a result the energy exerted in $M_b$ for the purpose of controlling as well as the energy inputted by road excitation are stored as rotation energy of the shaft c. This energy can be recuperated via the shaft motor 22 at the innermost shaft via the moment $M_c$.

As described above the three rotation inertias are responsible for the relationship between the individual moments. In the cardanic suspension two steady states exist. For the here relevant embodiment the rotational inertias satisfy the equation $$(J_a-J_b)(J_a-J_c) \leq 0$$

according to which the system is instable. A controller which controls the moment $M_b$ in dependence on $\omega_a$ has the dependency $$M_b = f(\omega_a, a_c, \dot{\omega}_c, M_a \ldots).$$

In a wheel suspension according to FIG. 1 the vertical road excitation is converted into a rotational movement by a transverse control arm at its site of support. At the axle a the damper arrangement according to the invention takes up the rotational movement $\phi_a$ resulting from the road excitation. In the function as rotational damper the moment acts in opposition to the rotational speed. This moment is caused by the rotation of the shaft b and c and is outputted as moment $M_a$ in the rotation $\phi_a$ of the shaft a. The manipulated variable is hereby the moment $M_b$. The rotational movement $\omega_c$ serves as inertia mass store, wherein a negative moment $M_c$ leads to a recuperation. In addition the set value M_b can also be used for recuperation.

In addition the actuator can be used to actively apply vertical forces on the wheel, i.e., to perform the function of an active chassis. An advantage relative to conventional systems, such as hydraulic or electromotive actuators is the high transmission ratio integrated in the actuator and the capability of storing energy. This relieves energy generation in the vehicle. Lower peak currents occur because power can be retrieved more uniformly. In addition, depending on the control strategy, the actuator may even feed back energy into the onboard grid by recuperation of dampening energy.

Beside the two shaft motors 20, 22 for shaft b and shaft c it is necessary to determine the state of motion of the system of the gyroscope at a given point in time with sufficient accuracy. It is necessary to accurately determine the angular position of shaft b because the shafts c and a are not permitted to be arranged on top of each other. In addition the angular position $\phi_a$ of shaft a has to be determined in order to be able to establish the relative orientation between shaft a and shaft b. Predominantly required for shaft c is the angular velocity; an angular position is not relevant due to symmetry effects.

From the angular position the corresponding angular velocity can be calculated. For an accurate measuring and further processing of the signals sensors, indicated in FIG. 1 by reference numerals 23 and 25, for determining the angular velocity of shaft a and b, and also the angular acceleration of shaft a, b and c are advantageous. FIG. 1 shows a sensor 17 for determining the rotation of shaft a.

The energy or power converted in the system is either of a same degree or is stored or outputted by the system.

Figure 2:
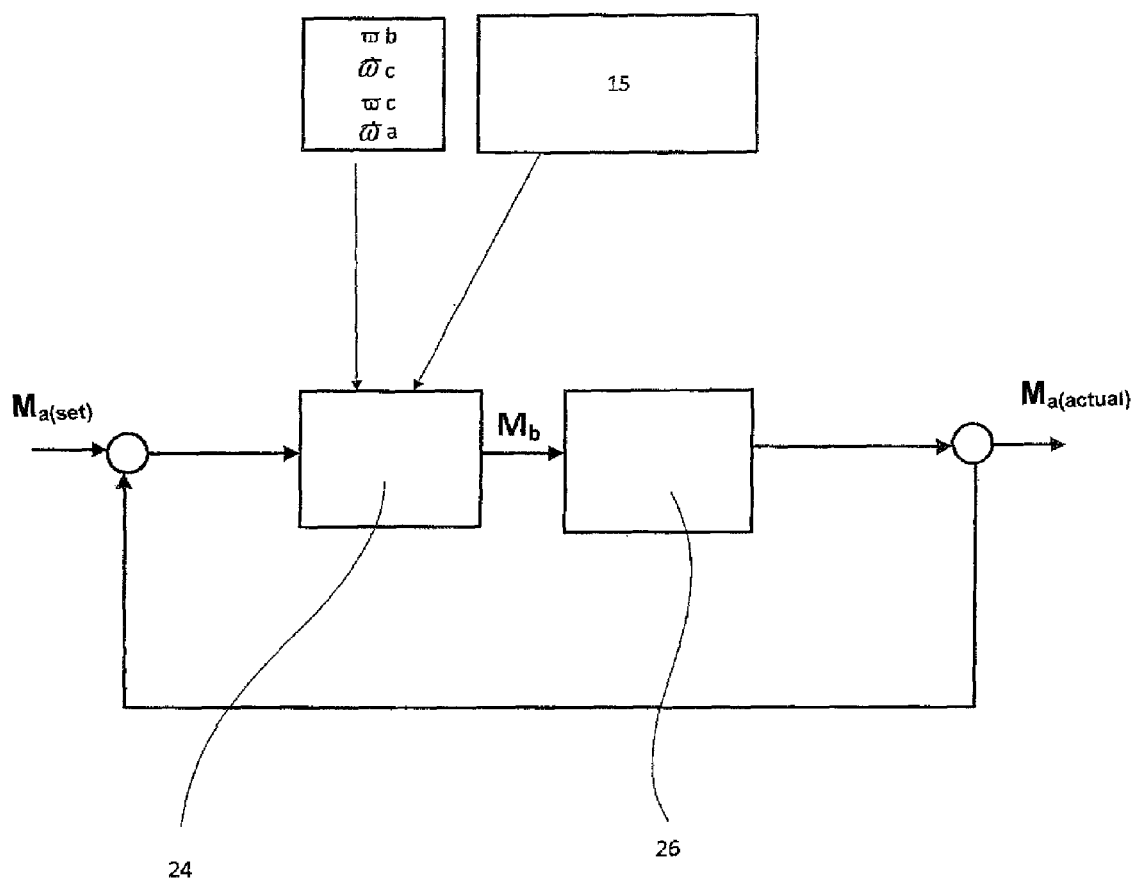
FIG. 2 a schematic control circuit of a control unit according to the present invention.

FIG. 2 shows a schematic control circuit of the control unit 16, which includes a controller 24 and a control loop 26. Usually the product of $M_a$ and $\omega_a$ is considered as input power. This power is derived from the road. The angular velocity $\omega_a$ is hereby determined by the movement of the wheel carrier. The moment $M_b$ and the angular velocity $\omega_b$ serve as set values for controlling the moment of the first shaft a. additional control information is provided to the controller via a laser sensor 15 of the vehicle.

According to the invention the moment $M_b$ is controlled so that the angular velocity $\omega_c$ and the acceleration of the shaft c always have the same sign. As a consequence the energy exerted for regulation in $M_b$ and also the energy inputted by road excitation are stored in the rotational energy of the shaft c. this energy can be recuperated via the shaft motor 22 of the innermost shaft via the moment Mc.

As described above the rotational inertias $J_i$ are responsible for the relationship of the individual moments to each other. In the cardanic suspension two steady states exist. For the instable system of the dampening arrangement, the controller provides the moment $M_b$ at least in dependence on $\omega_a$, $\omega_c$, $M_a$, $a_c$ while taking the position of the vehicle into account. The controller sets the set moment in dependence on the detected angular velocity $\omega_a$ based on a stored damper characteristic curve. The damper characteristic curve represents the course of the moment $M_a$ blotted over the angular velocity $\omega_a$.

In the simplest case $M_b$ acts in the opposite direction of $\omega_b$. Hereby the same amount of power is withdrawn from the system as inputted by the road. When a special characteristic curve between $M_a$ and $\omega_a$ is to be achieved $M_b$ cannot entirely act in the opposite direction of $\omega_b$ in case of a vibration. This means that as a result of the product of $M_b$ and $m_b$ a partial power remains beside the power that is converted by the road. This leads to an increase of the rotational speed a), of shaft c. The entire system then has a higher total power. When more power is absorbed by the product of $M_b$ and $\omega_b$ than inputted by the road, the angular velocity $\omega_c$ will decrease. Because $\omega_c$ always has to have a minimal speed, this minimal speed can be increased via the drive which drives the shaft c.

The increase of $\omega_c$ can for example be accomplished by way of an electric motor 22. This energy input can be dissipated at the shaft a or shaft b. The direction and number of the energy inputs and outputs is hereby arbitrary.

The invention claimed is:

1. A rotational damper for a motor vehicle, comprising:
   a gyro element, said gyro element comprising
      a first shaft, supported for rotation relative to a first component and connected with a second component, which performs a relative movement relative to the first component, said first shaft having a first frame,
      a second shaft rotatably supported in the first frame and arranged orthogonal to the first shaft, said second shaft having a second frame, said second shaft being connected with a first shaft drive, and
      a third shaft rotatably supported in the second frame and arranged orthogonal to the second shaft, said third shaft being connected with a second shaft drive, wherein a rotation of the second shaft by the first shaft drive causes a change of an angular velocity or a change of a moment of the first shaft;
   a first sensor for determining a rotation of the first shaft;
   a control unit operatively connected with the second shaft drive for adjusting an angular velocity and/or a moment of the second shaft; and
   a second sensor connected with a controller and adapted for determining a change in position of the first component.

2. The rotational damper arrangement of claim 1, wherein the control unit is connected with the second shaft drive so that the second shaft drive is capable of increasing the angular velocity and/or the moment of the second shaft.

3. The rotational damper arrangement of claim 1, wherein the first sensor is adapted for measuring an angular velocity or a moment of the first shaft and is connected with the control unit, said control unit controlling the angular velocity or the moment of the first shaft by using the angular velocity or the torque measured by the first sensor as a control value.

4. The rotational damper arrangement of claim 1, wherein the control unit controls the second shaft by introducing energy into or withdrawing energy from the second shaft drive by using the moment of the second shaft as a manipulated variable.

5. The rotational damper arrangement of claim 1, further comprising detection devices, which detect an angular position of the first shaft and the second shaft as input variables for the control unit.

6. The rotational damper arrangement of claim 1, wherein a transmission ratio between individual torques of the first, second and third shafts is a function of a rotational inertia of the inertia weight.

7. A method for controlling a rotational damper arrangement, comprising:
   providing the rotational damper arrangement of claim 1;
   controlling the torque of the first shaft and/or the angular velocity of the first shaft as a control variable; and
   influencing a manipulated variable of the second shaft so that a sign of an acceleration of the third shaft corresponds to a sign of an angular velocity of the third shaft.

8. The method of claim 7, further comprising storing a damper characteristic curve of the moment of the first shaft as a function of the angular velocity of the first shaft, wherein a set value for controlling the control variable is dependent on the measured angular velocity of the first shaft.

9. A cardanically supported gyro element for damping a movement of a first component of a motor vehicle relative to a second component of the motor vehicle, said gyro element comprising:
   a first shaft, supported for rotation relative to the first component and connected with the first component, said first shaft having a first frame,
   a second shaft rotatably supported in the first frame and arranged orthogonal to the first shaft, said second shaft having a second frame, said second shaft being connected with a first shaft drive, and
   a third shaft rotatably supported in the second frame and arranged orthogonal to the second shaft, said third shaft being connected with a second shaft drive, wherein a rotation of the second shaft by the first shaft drive causes a change of an angular velocity or a change of a moment of the first shaft, wherein the first component is a sprung mass of the motor vehicle and the second component is an unsprung mass of the motor vehicle.

\* \* \* \* \*